US012655002B2

(12) United States Patent
Stenson

(10) Patent No.: US 12,655,002 B2
(45) Date of Patent: Jun. 16, 2026

(54) JACK ASSEMBLY WITH SECONDARY SUPPORT FEATURES

(71) Applicant: Thomas H. Stenson, Enderlin, ND (US)

(72) Inventor: Thomas H. Stenson, Enderlin, ND (US)

(73) Assignee: Thomas N. Stenson, Rugby, ND (US)

(*) Notice: Subject to any disclaimer, the term of this patent is extended or adjusted under 35 U.S.C. 154(b) by 308 days.

(21) Appl. No.: 18/636,799

(22) Filed: Apr. 16, 2024

(65) Prior Publication Data

US 2024/0343536 A1 Oct. 17, 2024

Related U.S. Application Data

(60) Provisional application No. 63/459,830, filed on Apr. 17, 2023.

(51) Int. Cl.
*B66F 5/00* (2006.01)
*B66F 5/04* (2006.01)

(52) U.S. Cl.
CPC .......... *B66F 5/04* (2013.01); *B66F 2700/052* (2013.01)

(58) Field of Classification Search
CPC ...... B66F 3/10; B66F 3/28; B66F 5/00; B66F 5/02; B66F 5/04
See application file for complete search history.

(56) References Cited

U.S. PATENT DOCUMENTS

| | | | | |
|---|---|---|---|---|
| 5,520,360 A | 5/1996 | Wensman | | |
| 5,618,029 A | 4/1997 | Chung | | |
| 5,794,907 A | 8/1998 | Bellia | | |
| 5,878,996 A | 3/1999 | Loan | | |
| 6,986,503 B2 * | 1/2006 | Arzouman | B66F 3/36 | 254/93 H |
| 7,401,764 B1 * | 7/2008 | Castillo | B66F 5/04 | 254/93 H |
| 7,410,148 B2 * | 8/2008 | Arzouman | B66F 5/04 | 254/133 R |
| 7,413,166 B2 * | 8/2008 | Arzouman | B66F 13/00 | 254/2 B |
| 7,413,168 B2 * | 8/2008 | Arzouman | B66F 1/08 | 254/133 R |
| 7,434,782 B2 * | 10/2008 | Arzouman | B66F 13/00 | 254/2 B |
| 7,878,482 B2 | 2/2011 | Hernandez, Jr. | | |

(Continued)

*Primary Examiner* — Lee D Wilson

(57) ABSTRACT

A jack assembly includes a jack base and a primary support assembly. The primary support assembly includes a lift arm movably coupled to the jack base such that the jack assembly is movable between a lowered position and a raised position, a primary support member coupled to the lift arm and configured to engage a load when the jack assembly is in the raised position, and a handle configured to enable a user to cause movement of the lift arm. The jack assembly further includes a secondary support assembly. The secondary support assembly includes a secondary base supported by the jack base, a telescoping support movably coupled to the secondary base, and a secondary support member movably coupled to the telescoping support and coupled to the primary support member such that movement of the primary support member toward the raised position causes a corresponding movement in the secondary support member.

20 Claims, 10 Drawing Sheets

(56) References Cited

U.S. PATENT DOCUMENTS

| | | | | |
|---|---|---|---|---|
| 8,201,807 | B2 | 6/2012 | Hernandez | |
| 8,695,941 | B1 * | 4/2014 | Groves | B66F 3/00 254/102 |
| 8,740,190 | B2 | 6/2014 | Tijerina | |
| 9,527,706 | B2 | 12/2016 | Arzouman | |
| 9,758,359 | B2 | 9/2017 | Kamphuis et al. | |
| 9,771,248 | B1 | 9/2017 | Zimmerman | |
| 10,060,142 | B2 | 8/2018 | Haessler et al. | |
| 10,723,603 | B1 | 7/2020 | Curtis et al. | |
| 11,235,962 | B2 | 2/2022 | Tijerina | |
| 11,286,140 | B2 | 3/2022 | Andersen et al. | |
| 11,505,440 | B1 | 11/2022 | Christensen | |
| 11,535,500 | B1 | 12/2022 | Flippin | |
| 2006/0278857 | A1 | 12/2006 | Brocchini | |
| 2006/0278858 | A1 | 12/2006 | Brocchini | |
| 2007/0114500 | A1 | 5/2007 | Hernandez | |
| 2008/0111117 | A1 | 5/2008 | Wu | |
| 2008/0173852 | A1 | 7/2008 | Woodbury et al. | |
| 2009/0283733 | A1 | 11/2009 | Lyashevskiy et al. | |
| 2010/0133727 | A1 | 6/2010 | Fribourg-Blanc et al. | |
| 2014/0061560 | A1 | 3/2014 | Aristi Artolazabal | |
| 2015/0290058 | A1 * | 10/2015 | Panzer | A61G 3/063 403/109.6 |
| 2015/0307333 | A1 | 10/2015 | Emsky | |
| 2023/0348243 | A1 * | 11/2023 | Kung | B66F 3/38 |
| 2024/0124280 | A1 * | 4/2024 | Rourk | B66F 3/28 |
| 2024/0343536 | A1 * | 10/2024 | Stenson | B66F 5/04 |

* cited by examiner

JACK ASSEMBLY WITH SECONDARY SUPPORT FEATURES

CROSS-REFERENCE TO RELATED PATENT APPLICATION

This application claims the benefit of and priority to U.S. Provisional Application No. 63/459,830, filed Apr. 17, 2023, the entire disclosure of which is incorporated by reference herein.

BACKGROUND

The present invention relates generally to the field of jack assemblies, and more specifically to jack assemblies (e.g., floor jacks, etc.) intended to raise an object (e.g., a vehicle, etc.) and bear the load of the object.

SUMMARY

One embodiment of the invention relates to a jack assembly including a jack base; a primary support assembly including a lift arm movably coupled to the jack base such that the jack assembly is movable between a lowered position and a raised position; a primary support member coupled to the lift arm and configured to engage a load when the jack assembly is in the raised position; and a handle configured to enable a user to cause movement of the lift arm; and a secondary support assembly including a secondary base supported by the jack base; a telescoping support movably coupled to the secondary base; and a secondary support member movably coupled to the telescoping support and coupled to the primary support member such that movement of the primary support member toward the raised position causes a corresponding movement in the secondary support member.

In some embodiments, the primary support member defines a first support surface configured to engage the load and the secondary support member defines a second support surface configured to engage the load; where the second support surface is recessed relative to the first support surface when the jack assembly is in the raised position. In some embodiments, the jack assembly includes a positioning member coupled to and extending between the primary support assembly and the secondary support assembly, the positioning member configured to maintain the secondary support assembly vertically aligned with the primary support member as the primary support assembly moves. In some embodiments, the positioning member extends between the lift arm of the primary support assembly and the secondary base of the secondary support assembly.

In some embodiments, the jack assembly includes an upper support arm coupling the secondary support member to the telescoping support. In some embodiments, the upper support arm includes a plurality of projections and the telescoping support includes at least one pawl, where the at least one pawl is configured to selectively engage one of the plurality of projections to releasably secure the upper support arm at a desired height relative to the telescoping support.

In some embodiments, the telescoping support comprises a plurality of projections and the secondary base comprises at least one pawl, where the at least one pawl is configured to selectively engage one of the plurality of projections to releasably secure the telescoping support at a desired height relative to the secondary base. In some embodiments, the jack assembly includes a control member extending from the at least one pawl to the handle, where actuation of the control member causes the at least one pawl to disengage from the one of the plurality of projections and enable the telescoping support to telescope into the secondary base. In some embodiments, the control member includes a control cable extending along the handle and graspable by the user.

In some embodiments, the secondary support assembly is configured to support the load in the event of a failure of the primary support assembly. In some embodiments, the secondary support assembly is configured to transmit a force of the load from the secondary support member to the jack base along a secondary load path that is substantially independent from a primary load path configured to transfer the force of the load from the primary support member to the jack base. In some embodiments, the telescoping support comprises a plurality of telescoping supports configured to nest with each other and the secondary base when the jack assembly is in the lowered position.

Another embodiment relates to a jack assembly including a jack base; a primary support assembly including a lift arm movably coupled to the jack base such that the jack assembly is movable between a lowered position and a raised position; a primary saddle coupled to the lift arm and configured to engage a load when the jack assembly is in the raised position; and a handle configured to enable a user to cause movement of the lift arm; a secondary support assembly including a secondary base supported by the jack base; a secondary saddle coupled to the primary support member such that movement of the primary saddle toward the raised position causes a corresponding movement in the secondary saddle; and a plurality of telescoping supports extending between the secondary base and the secondary saddle, where the plurality of telescoping supports are releasably lockable at a plurality of different heights.

In some embodiments, the primary saddle defines a first support surface configured to engage the load and the secondary saddle defines a second support surface configured to engage the load; where the second saddle is recessed relative to the first saddle when the jack assembly is in the raised position. In some embodiments, the jack assembly includes a positioning member coupled to and extending between the primary support assembly and the secondary support assembly, the positioning member configured to maintain the secondary support assembly vertically aligned with the primary saddle as the primary support assembly moves. In some embodiments, the positioning member extends between the lift arm of the primary support assembly and the secondary base of the secondary support assembly.

In some embodiments, the jack assembly includes a plurality of upper support arms coupling the secondary saddle to the plurality telescoping supports, where the plurality of upper support arms each include a plurality of projections and the plurality of telescoping supports each comprise at least one pawl, where the at least one pawl is configured to selectively engage one of the plurality of projections to releasably secure each of the plurality of upper support arms at a desired height relative to the telescoping support.

In some embodiments, the plurality of telescoping supports each include a plurality of projections and the secondary base includes at least one pawl, where the at least one pawl is configured to selectively engage one of the plurality of projections to releasably secure the plurality of telescoping supports at a desired height relative to the secondary base. In some embodiments, the jack assembly includes a control member extending from the at least one pawl to the handle, where actuation of the control member causes the at least one pawl to disengage from the one of the plurality of projections and enable the plurality of telescoping supports to telescope into the secondary base.

Another embodiment relates to a jack assembly including a jack base; a primary support assembly including a lift arm movably coupled to the jack base such that the jack assembly is movable between a lowered position and a raised position; a primary support member coupled to the lift arm and configured to engage a load when the jack assembly is in the raised position; and a handle configured to enable a user to cause movement of the lift arm; where the primary support assembly defines a primary load path between the load and the jack base; a secondary support assembly including a secondary base supported by the jack base; a secondary support member coupled to the primary support member such that movement of the primary support member toward the raised position causes a corresponding movement in the secondary support member; a plurality of telescoping supports extending between the secondary base and the secondary support member; where, in the event of a failure of the primary support assembly, the secondary support assembly provides a secondary load path between the load and the jack base that is substantially independent from the primary load path.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
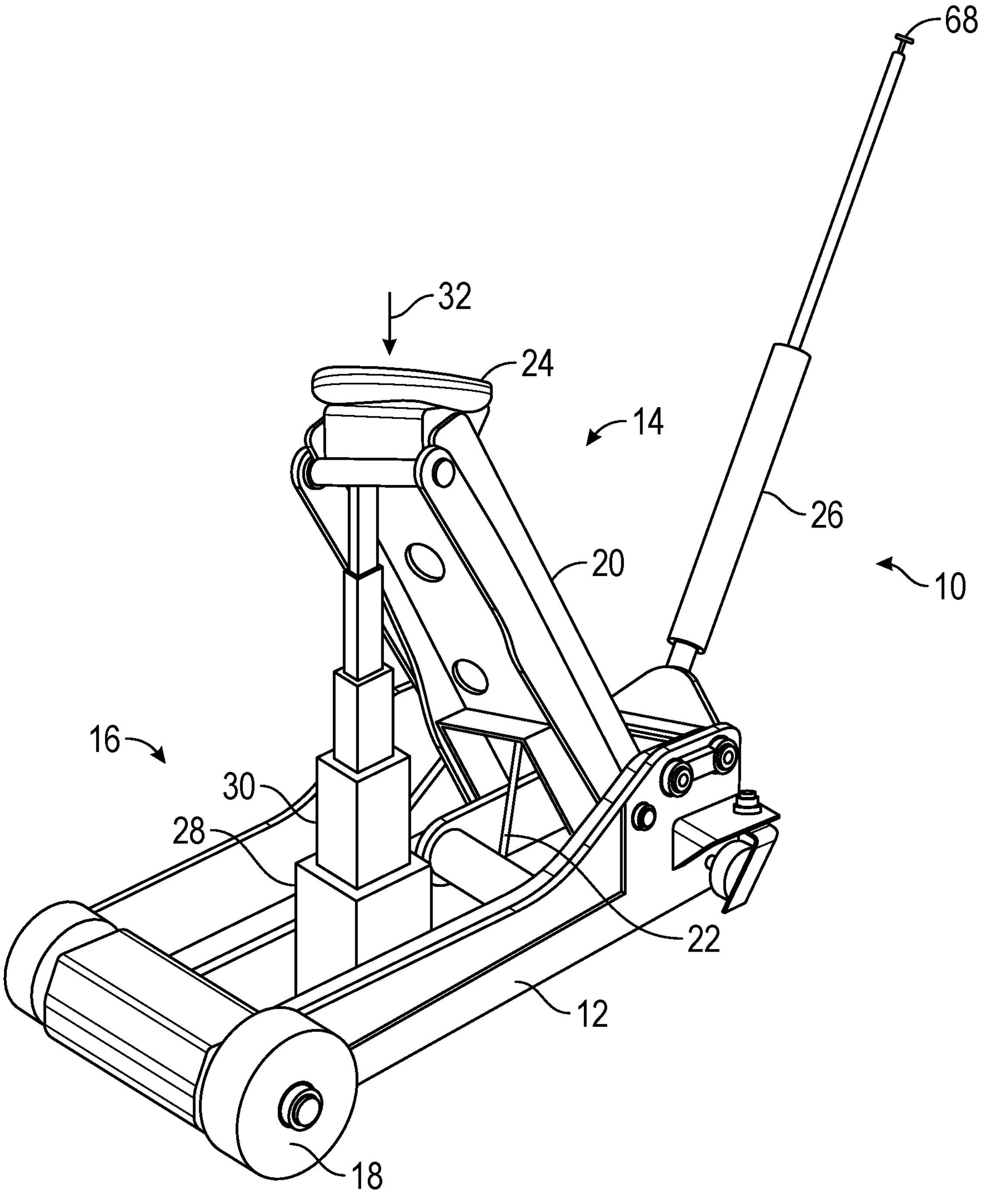
FIG. 1 is a perspective view showing a schematic illustration of a jack assembly including a secondary support assembly according to one embodiment.
Figure 2A:
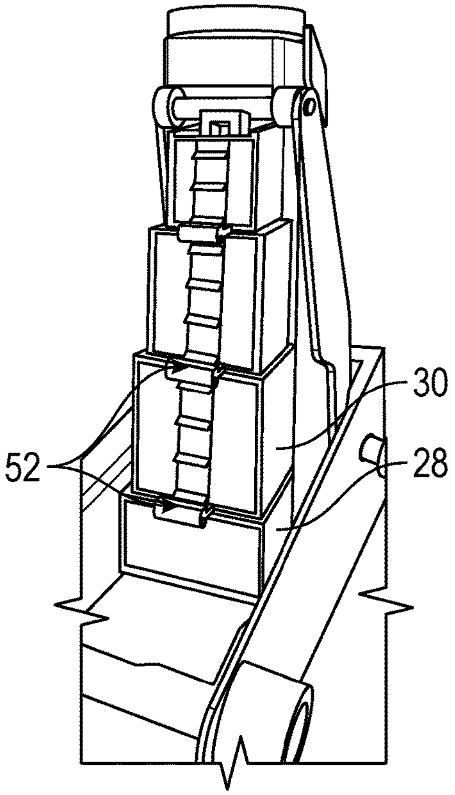
FIGS. 2A-2D are perspective views of the jack assembly of FIG. 1, according to some embodiments.
Figure 2B:
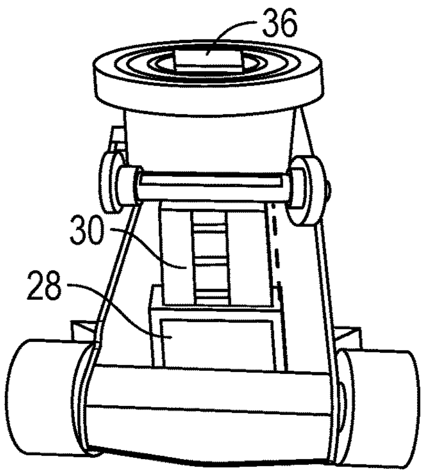
Figure 2C:
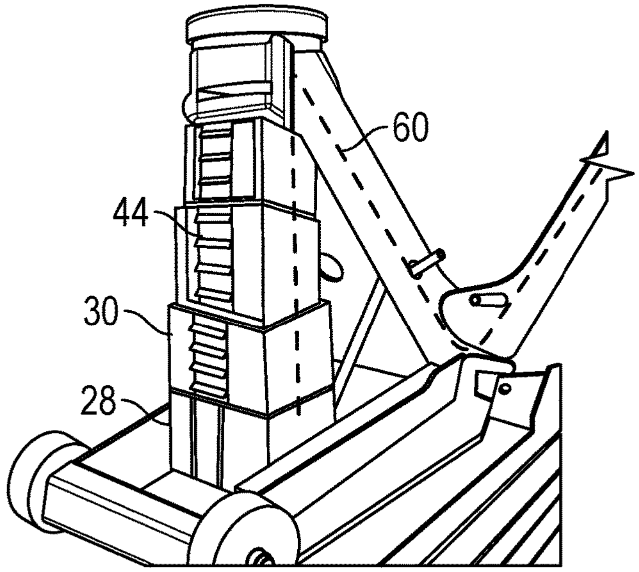
Figure 2D:
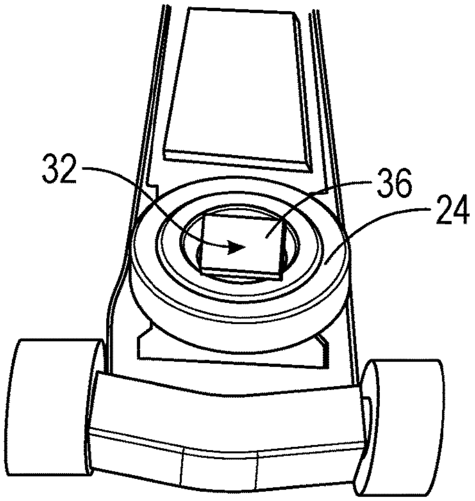
Figure 3:
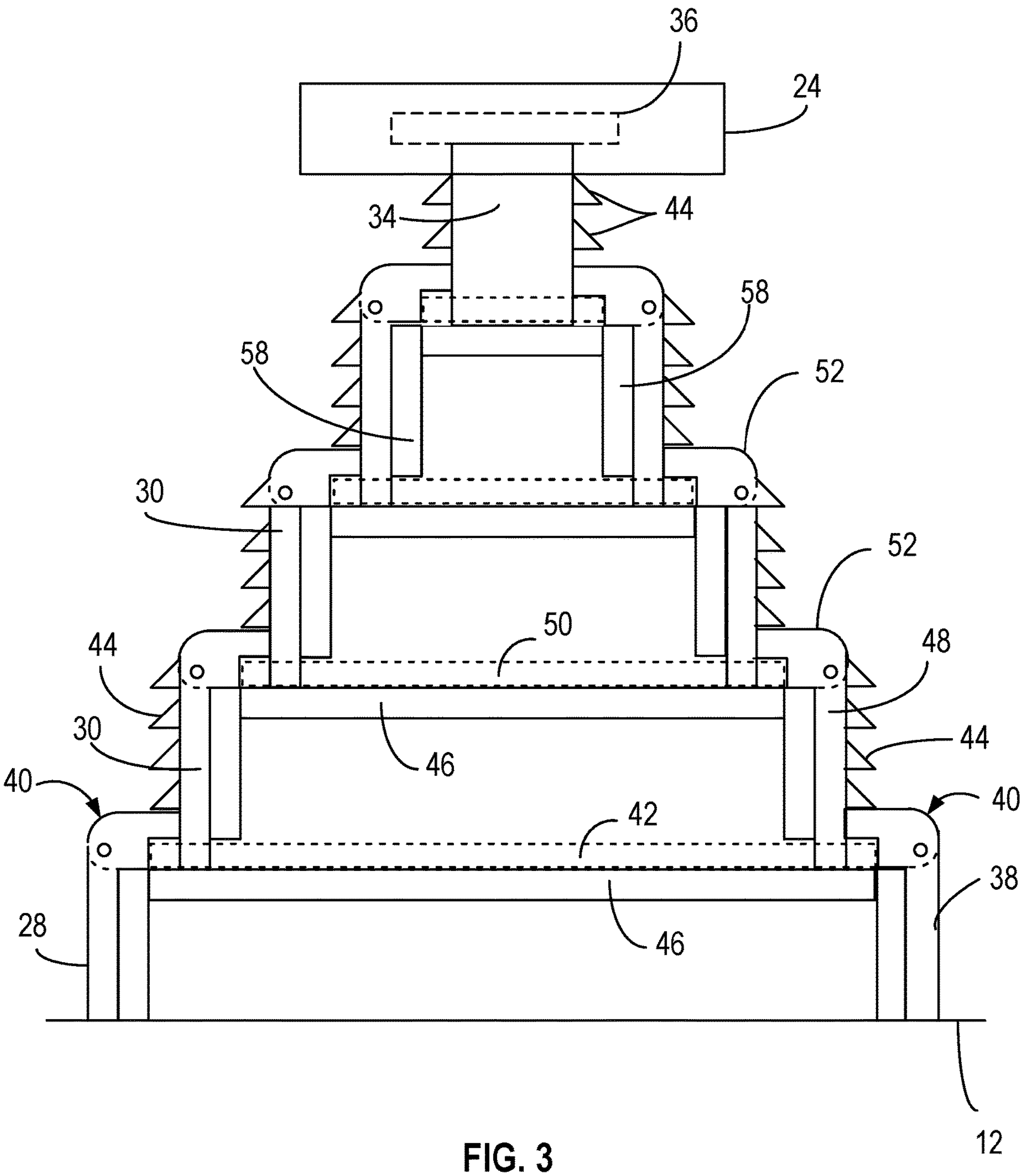
FIGS. 3-9 are various side views of a secondary support assembly usable with the jack assembly of FIG. 1 according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the Figures, various embodiments disclosed herein relate to floor jacks or similar jack assemblies that are usable to lift and support a load, such as a vehicle, etc. The jack assembly may include a primary support assembly and a secondary support assembly supported on a jack base. The primary support assembly is actuated by a user (e.g., by manipulation of a handle connected to a hydraulic system, by engaging a pedal configured to release a cable, etc.) to move the jack assembly between a lowered position (e.g., for moving positioning, storing, etc. of the jack assembly) and a raised position (e.g., during support of a load). In case of failure of the primary support assembly (e.g., due to mechanical failure, leakage of hydraulic fluid, etc.), the secondary support assembly is configured to support the load at a desired height.

The secondary support assembly may include a number of nested supports that couple a secondary saddle or support member to a secondary base. As the primary support assembly is raised, the secondary support assembly is raised as well, and locked into increasingly higher positions as the jack assembly is raised. The secondary support assembly then remains locked in position until the jack assembly is ready to be lowered, at which time the user may actuate a control member to enable the secondary support assembly to lower. In some embodiments, the nested supports use a number of pawls and projections/teeth that operate in a ratcheting manner to lock the supports in any of a number of raised positions. The control member may include a cable that a user may pull to disengage the pawls from the projections and allow the supports to lower. The secondary support assembly provides a nested design that enables the secondary support assembly to maintain a low profile, thereby enabling the jack assembly to fit under low clearance areas of vehicles or other objects prior to being raised.

Referring now to FIGS. 1-10, a jack assembly 10 (e.g., a floor jack, a lift device, etc.) is shown according to one embodiment. The jack assembly 10 includes a jack base 12, a primary support assembly 14, and a secondary support assembly 16. The primary support assembly 14 and the secondary support assembly 16 are supported by the jack base 12. One or more support members 18 (e.g., wheels, etc.) may be coupled to the jack base 12 to facilitate moving and positioning of the jack assembly 10.

The primary support assembly 14 includes a lift arm 20, a lifting mechanism 22, a primary support member or saddle 24, and a handle 26. The lift arm 20 is movable relative to the jack base 12 between a lowered position and a raised position (as shown in FIG. 1). The lifting mechanism 22 provides the lifting force for the lifting arm 20, and may include a mechanical lift mechanism (e.g., a threaded mechanism), a hydraulic mechanism, etc. The primary support member 24 is coupled to or part of the lift arm 20, and is configured to engage a load (e.g., a vehicle or other object). The handle 26 is configured to enable a user to operatively engage the lift mechanism 22 to raise and lower the primary support assembly 14. The handle 26 may be manipulated (e.g., moved back and forth, rotated, etc.) to actuate the lift mechanism 22. In one embodiment, the lift mechanism 22 includes one or more hydraulic cylinders, and the handle 26 is usable to pump hydraulic fluid between cylinders to raise the lift arm 20. Furthermore, the handle 26 may be rotatable to release hydraulic fluid and enable lowering of the lift arm 20.

Alternatively or additionally, in some embodiments, the jack assembly 10 may include a pedal (e.g., a button, a release mechanism, etc.) configured to enable a user to operatively engage the lift mechanism 22 to raise and lower the primary support assembly 14. The pedal may be manipulated (e.g., pressed upon by a foot, a hand, any other application of pressure, etc.) to release a cable (e.g., control member 60, as described in greater detail below) configured to hold the jack assembly 10 in a locked position (e.g., specifically configured to lock the pawls 52, as described in greater detail below). As soon as the cable is released, the lift mechanism 22 may be configured to raise and lower the primary support assembly 14. In some embodiments, the pedal may be coupled to the jack assembly 10 at a lower distal portion of the jack base 12 (e.g., beneath an attachment point of the handle 26 to the jack assembly 10, as shown in FIG. 1).

Figure 8:
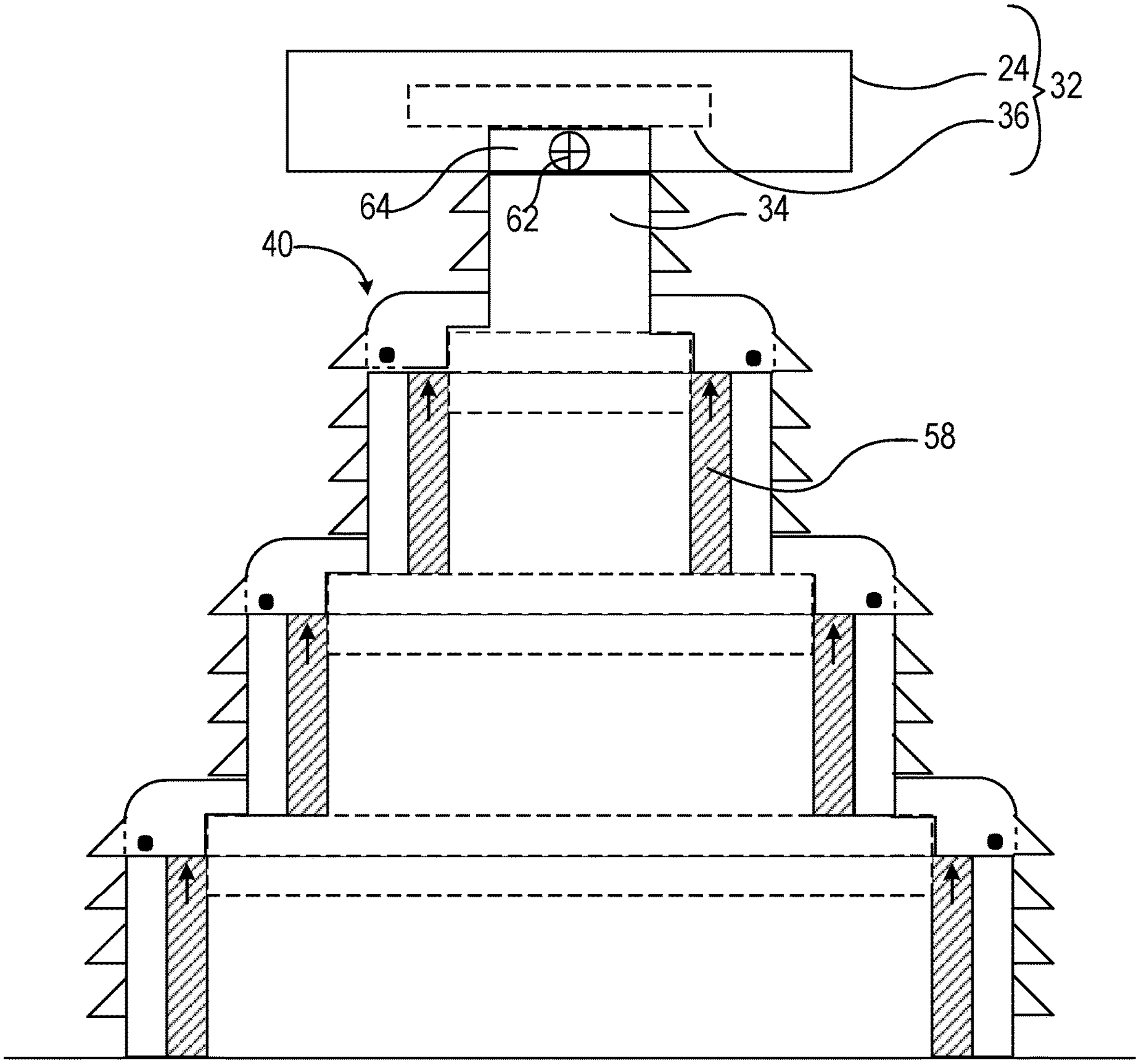

The secondary support assembly 16 includes a secondary support base 28, one or more telescoping supports 30, and a secondary saddle assembly 32 (see FIG. 8). The secondary support base 28 is supported by the jack base 12. The one or more telescoping supports 30 nest within each other and within the secondary support base 28 and are configured to telescope relative to each other as needed as the jack assembly 10 moves between the lowered and raised positions. The secondary saddle assembly 32 telescopes relative to the one or more telescoping supports 30 in a similar manner. The secondary saddle assembly 32 includes a support arm 34 (e.g., a column, shaft, etc.) (see FIG. 8) and a secondary support member 36 coupled to the support arm 34. The secondary support member 36 is configured to engage the load/object should there be a failure in the primary support assembly 14. The force from the load is transferred from the secondary support member 36, through the one or more telescoping supports 30, to the secondary support base 28, and to the jack base 12. In other words, the secondary support assembly 16 provides a load path from the secondary support member 36 to the jack base 12 that is substantially independent from the load path from the primary support member 24 to the jack base 12.

Referring to FIGS. 3-9, the secondary support base 28, the telescoping supports 30, and the support arm 34 nest with each other in the lowered position, and may be releasably secured in any number of raised positions to secure an object at a desired height. To provide securement of the various components, pawls 52 and projections 44 (e.g., gears, etc.) may be used according to some embodiments, as discussed in further detail below.

In some embodiments, the secondary support base 28 includes a base housing 38, one or more pawl assemblies 40, and one or more stop lips 42. The base housing 38 is in one embodiment generally rectangular in shape and configured to be received by the jack base 12. The base housing 38 may be differently shaped according to alternative embodiments. The base housing 38 has a top opening that enables the telescoping supports 30 to telescope into and out of the base housing 38 as the secondary support assembly 16 moves between a lowered position and a raised position.

The secondary support base 28 further includes one or more pawl assemblies 40 that releasably secure the telescoping supports 30 in one of a number of positions (e.g., depending on the height of the jack assembly 12). When the primary support member 24 begins to move, the primary support member 24 lifts the secondary support member 36 and the support arm 34 upwards from a recessed position (e.g., shown in FIG. 5). As the secondary support member 36 and the support arm 34 are lifted upwards, the pawl assemblies 40 on the secondary support base 28 engage gears or projections 44 on the telescoping support 30, starting with the upper-most telescoping support 30 and locking the telescoping support 30 in position at each sequentially lower position. Eventually, the stop lip 42 on the base housing 38 engages a lift lip 46 on the bottom-most telescoping support 30 to prevent further upward movement of the telescoping support 30.

The telescoping supports 30 include a support housing 48, one or more pawl assemblies 40, one or more stop lips 50, one or more lift lips 46, and a number of gears or projections 44. In one embodiment, the projections 44 are located on opposite sides of the support housing 48 and are spaced apart along the height of the support housing 48 (e.g., along the front and back sides of the support housing 48). The pawl assemblies 40 are generally located above each series of projections 44. In one embodiment, two stop lips 50 are provided on the top of the support housing 48 on opposing sides (e.g., the left and right sides of the support housing 48). The stop lips 50 are in one embodiment formed by an inward-extending flange that is formed as part of or coupled to the support housing 48. The lift lips 46 are generally provided on the same side(s) of the support housing 48 as the stop lips 50 (e.g., the left and right sides) and in one embodiment are formed by an outward extending flange that is formed as part of or coupled to the support housing 48. In this way, the inward extending stop lip 50 at the top of a lower/outward positioned telescoping support 30 engages the outward extending lift lip 46 at the bottom of a higher/inward telescoping support 30. As the inward/higher telescoping support 30 is raised, the interface of the lift/stop lips 46, 50 eventually causes the higher telescoping support 30 to raise the lower telescoping support 30.

The projections 44 (e.g., ratchet gears, teeth, etc.) are in one embodiment triangular in cross-section, as shown in the Figures, to facilitate moving past the pawl assemblies 40 and rotating the pawl assemblies 40 outward and out of the way as each telescoping support 30 moves upward. In one embodiment, the projections 44 are provided on opposite sides of the support housing 48, and are located centrally on each side generally aligned with the position of the corresponding pawl assemblies 40 (see FIG. 8). The projections 44 may be evenly spaced apart along the height of each telescoping support 30.

The pawl assembly 40 includes a pawl 52 received on a rotatable pawl arm 54 and a pawl shaft 56 coupled to the pawl arm 54. The pawls 52 rotate outward to enable raising of the secondary support assembly 16. The bottom of the pawl 52 engages the top of a pawl wall 58 to prevent inward rotation of the pawl 52 that would enable the telescoping supports 30 to move downward again. As such, as each projection 44 on a higher telescoping support passes the pawls 52, the projection 44 is prevented from moving back downward until released by a user, as discussed in greater detail below. The pawl 52 and the pawl shaft 56 rotate with the pawl arm 54. The pawl shaft 56 may be provided at one or both ends of the pawl arm 54 and coupled to one or more control members 60 (e.g., a control cable, etc.). As discussed in greater detail, actuation of the control member 60 releases the pawls 52 from the projections 44 and enables the telescoping supports 30 to return to a lowered and nested position.

In one embodiment, the secondary saddle assembly 32 includes a secondary support or saddle 36 (e.g., a secondary support member, etc.) that rests upon a support arm 34. In one embodiment, the secondary support 36 is removably coupled to the support arm 34 (e.g., via a set screw 62). For example, the secondary saddle assembly 32 may include a shaft cap 64 that slides over an upper portion of the support arm 34 and receives one or more set screws 62 through a sidewall of the shaft cap 64 to secure the secondary support 36 in place.

In one embodiment, the secondary support 36 is positioned inside a recess of the primary support 24, such that as the primary support 24 is raised, the primary support 24 causes the secondary support 36 to be raised. In this way, as the primary support 24 moves upward, it “pulls” the secondary support 36 up with the primary support 24. The primary support 24 includes a primary support surface configured to support a load (e.g., a vehicle, etc.). The secondary support 36 includes a secondary support surface that, under normal operation of the jack assembly 10, is recessed relative to the primary support surface. In the case of a failure of the primary support assembly 14, should the primary support surface move downward, the secondary support surface is configured to engage the load.

The primary support assembly 14 and the secondary support assembly 16 define separate load paths for supporting a load. For example, the primary support assembly 14 transmits forces of a load from the primary support 24, to the lift arm 20, to the jack base 12. Should the primary support assembly 14 fail, the secondary support assembly 16 is configured to engage the load and transmit the forces of the load from the secondary support 36, to the support arm 34, to the telescoping supports 30, to the secondary support base 28, and to the jack base 12.

In one embodiment, the secondary support assembly 16 is configured to be vertically aligned (e.g., substantially vertically below) the primary support member 24. As such, a positioning member 66 may couple the primary support assembly 14 to the secondary support assembly 16 and be configured to maintain the secondary support assembly 16 in a desired position relative to the primary support assembly 14 as the primary support assembly 14 moves between the raised and lowered positions. In one embodiment, the positioning member 66 includes a positioning rod that extends between the lift arm 20 of the primary support assembly 14 and the secondary support base 28 of the secondary support assembly 16, such that as the lift arm 20 moves, the secondary support base 28 may slide along the jack base 12 to maintain the desired alignment with the primary support member 24. In other embodiments other means of maintaining alignment between components may be utilized.

Figure 4:
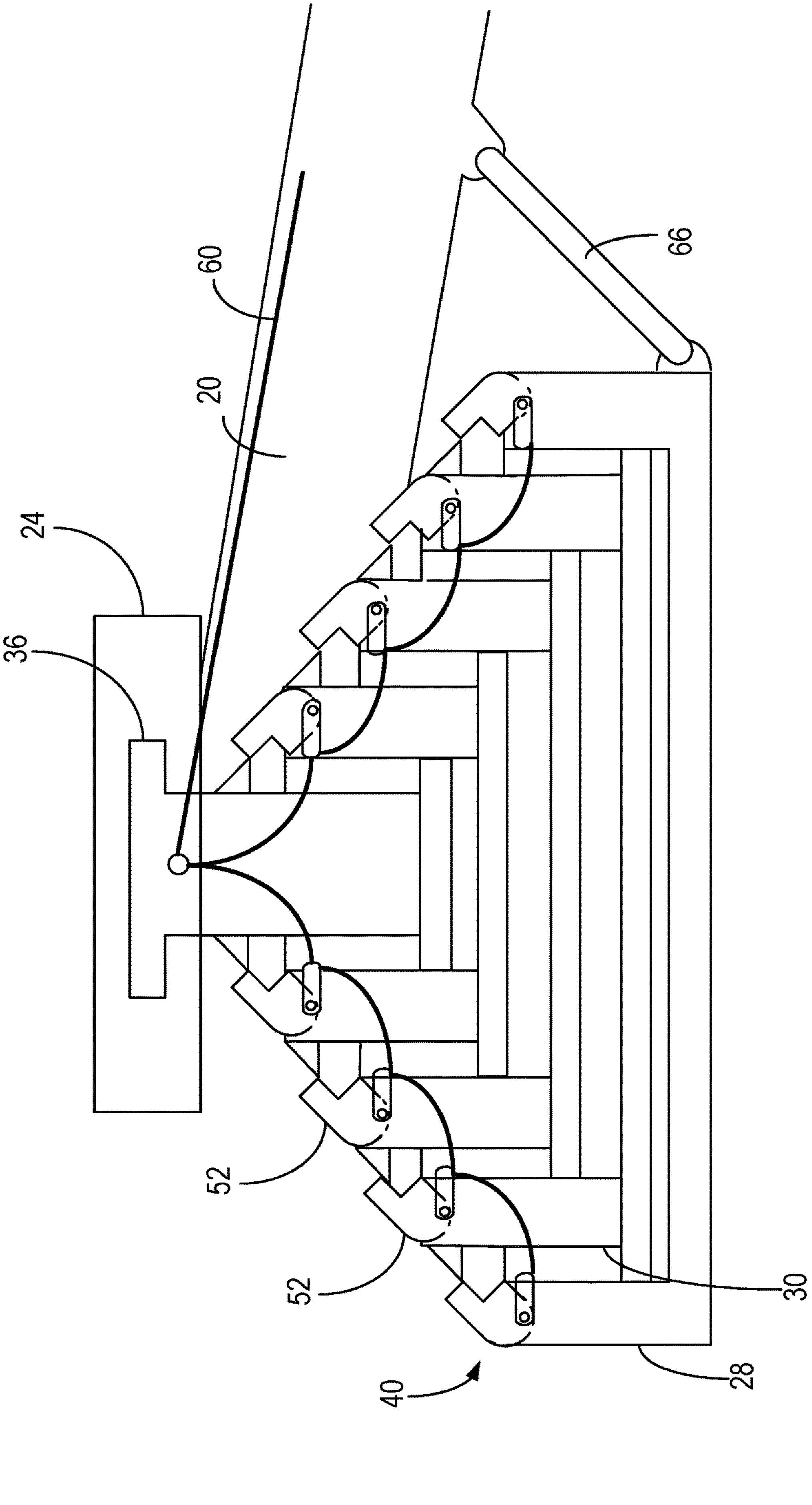
Figure 5:
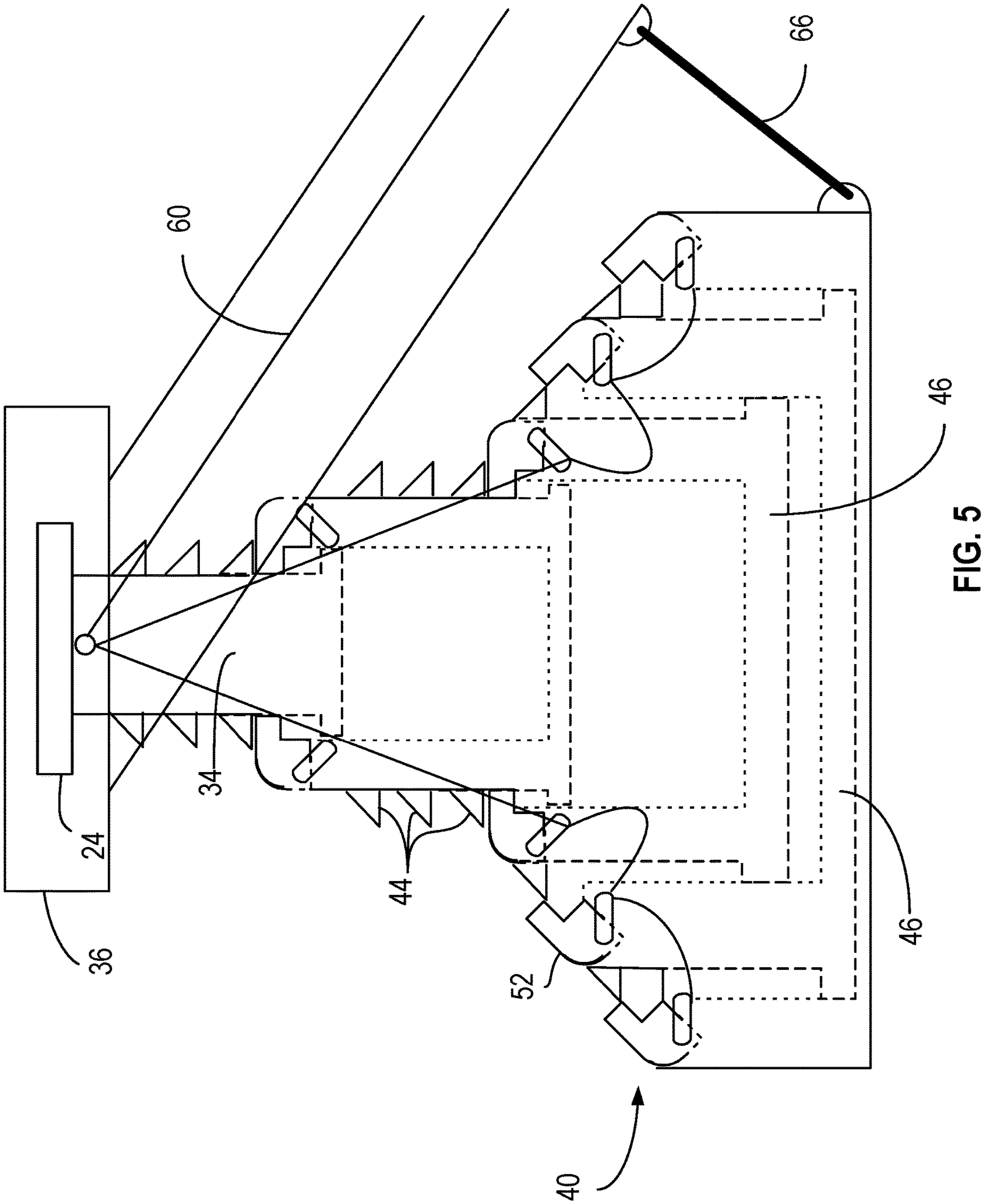
Figure 6:
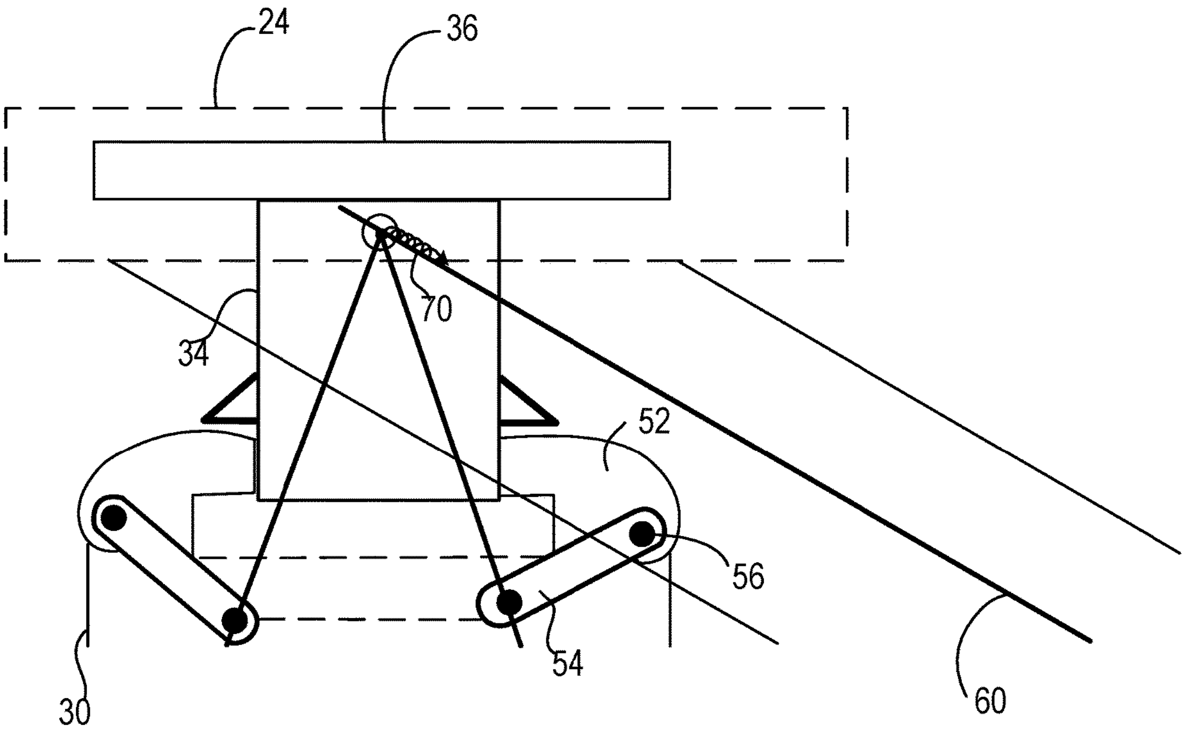
Figure 7:
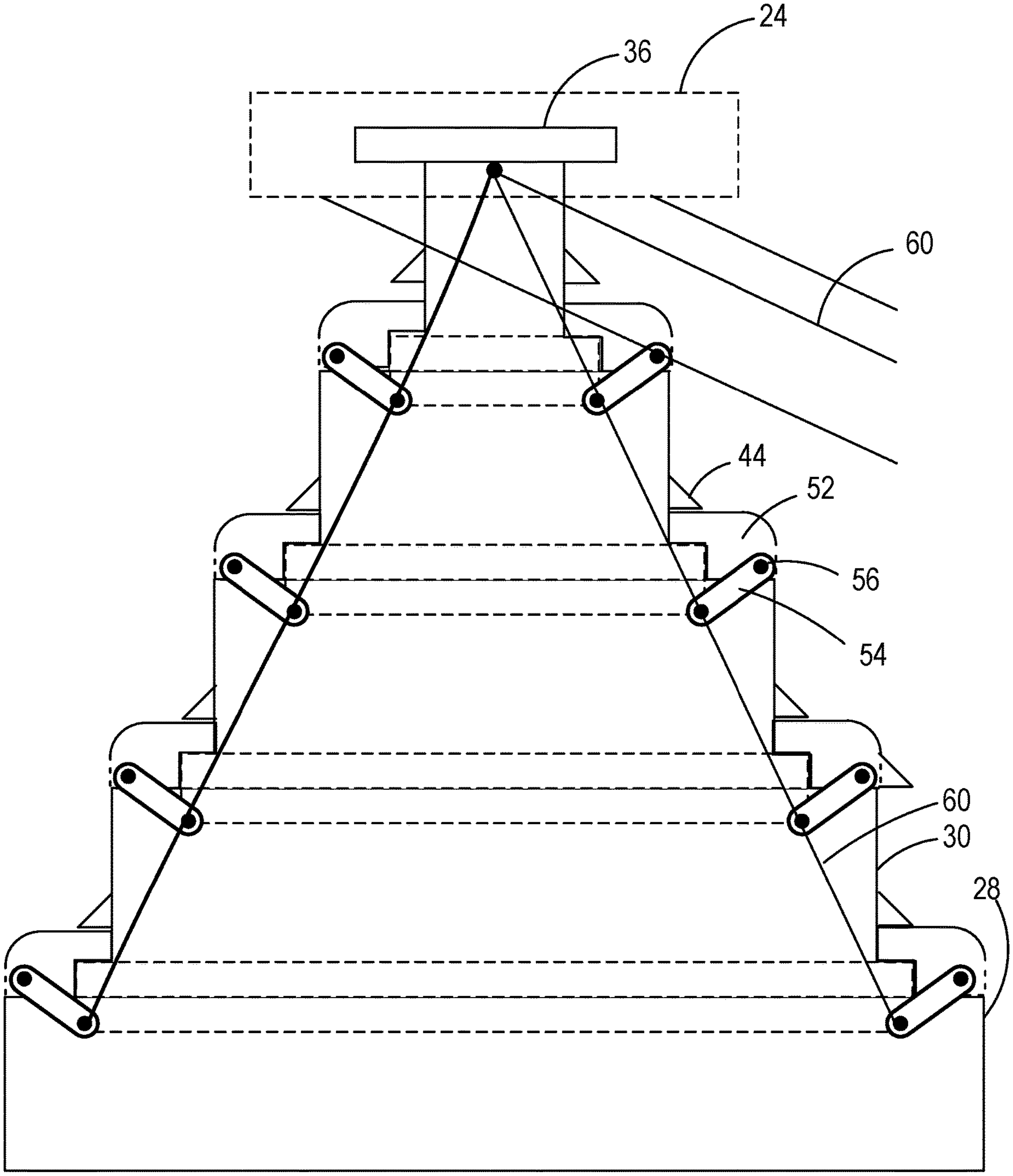

Referring to FIGS. 4-7, the secondary support assembly 16 may utilize a control member 60 (e.g., a control cable, etc.) to enable releasing the pawls 52 from a locked position. The control cable 60 is routed along the jack handle 26, the lift arm 20, and coupled to each of the pawl shafts 56 on the pawl arms 54. A control member handle 68 may be provided for engagement by a user at an end of the control member 60. As shown in FIG. 4, in a lowered position, the pawls 52 are unlocked, and the control member 60 has slack to enable rotation of the pawls 52. As the secondary support assembly 16 is moved toward the raised position, the pawls 52 become locked in position as the control member 60 becomes taught, thereby preventing downward movement of the telescoping supports 30. Should a user wish to release or unlock the pawls 52 of the secondary support assembly 16, the user pulls on the control member 60 (e.g., via control member handle 68), thereby rotating the pawl shaft 56 and pawl arms 54, causing a corresponding outward rotation of the pawls 52 to move the pawls 52 out of interference with the projections 44. In some embodiments, a tension spring 70 may be coupled to the control member 60 in order to maintain proper tension on the control member 60 during use (see, e.g., FIG. 6).

Figure 9:
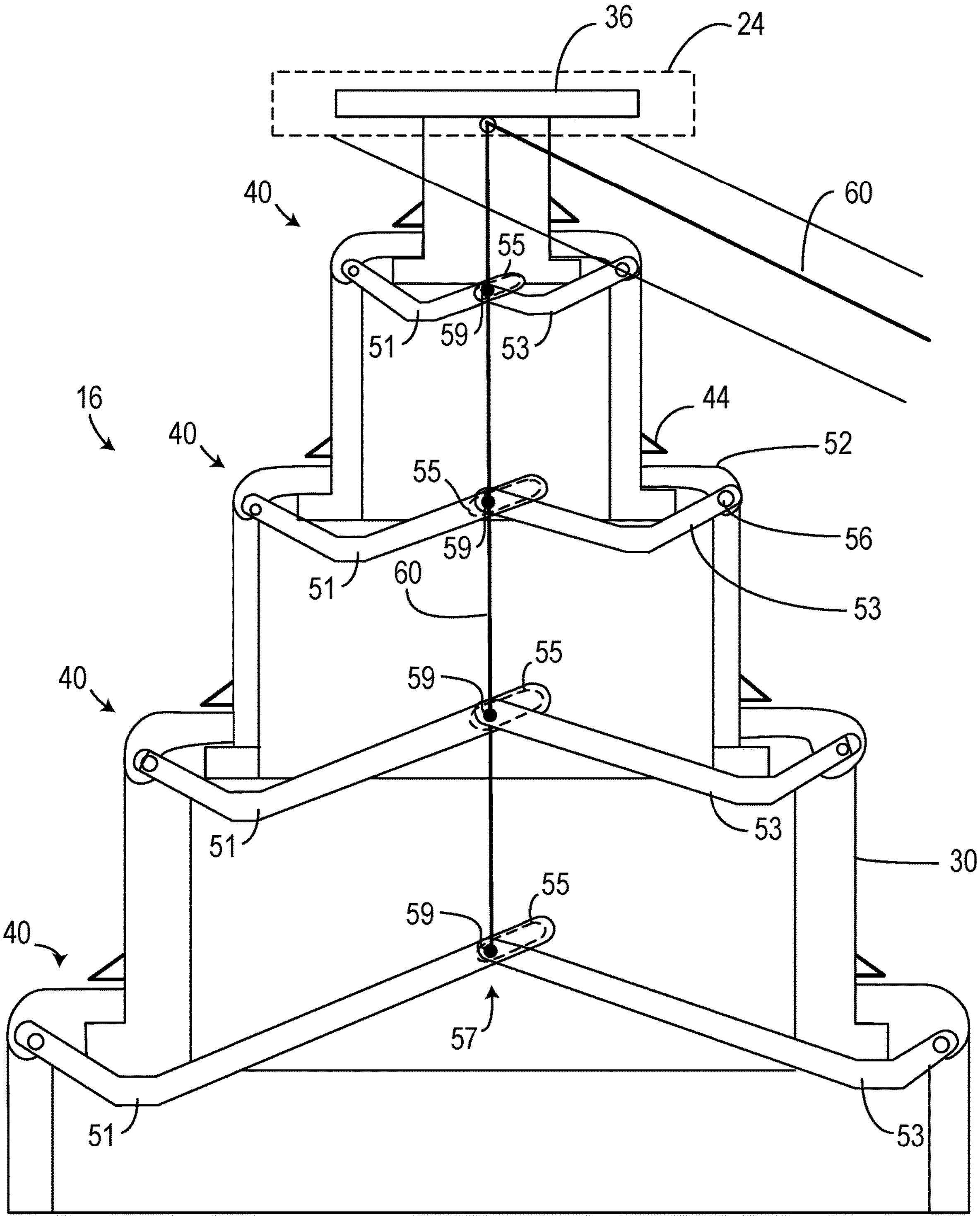
Figure 10:
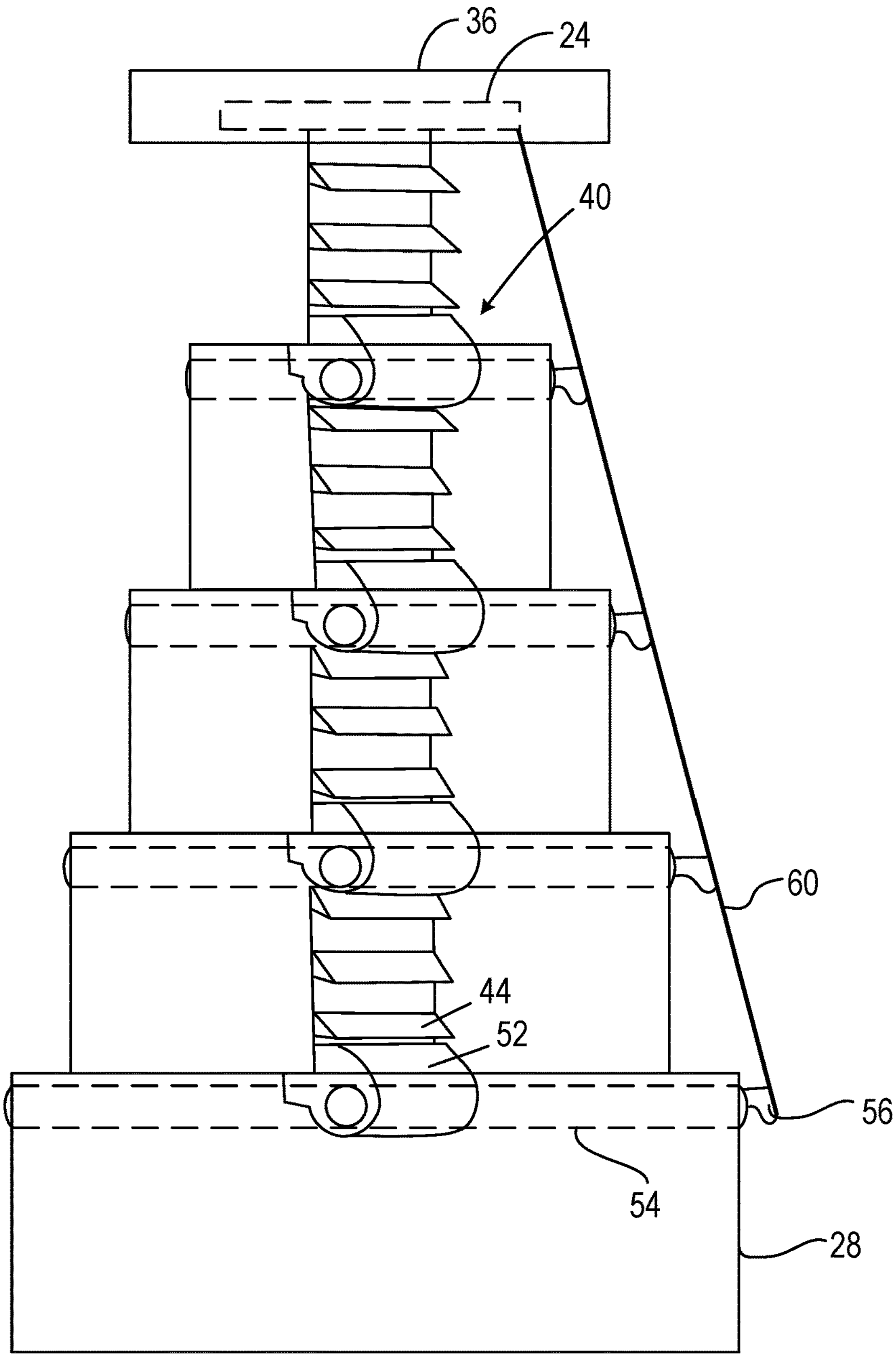
FIG. 10 is a front view of a secondary support assembly usable with the jack assembly of FIG. 1 according to some embodiments.

Referring to FIG. 9, an embodiment of the secondary support assembly 16 including a single control member 60 is shown. As shown in FIG. 9, the one or more pawl assemblies 40 of each telescoping support 30 include the pawl 52, a first pawl arm 51, a second pawl arm 53, and the pawl shaft 56. The pawl shaft 56 may be provided at opposing ends of each of the first pawl arm 51 and the second pawl arm 53. At a proximate end of each of the first pawl arm 51 and the second arm 53, each of the first pawl arm 51 and the second arm 53 may include a linkage assembly 57. The linkage assembly 57 may be configured to couple the first pawl arm 51 to the second pawl arm 53 and to the single control member 60. More specifically, as shown in FIG. 9, each linkage assembly 57 includes a slot 55. The slot 55 may be formed on the first pawl arm 51 and may define a cavity at the proximate end of the first pawl arm 51 that is configured to receive the proximate end of the second pawl arm 53 or a corresponding pin coupled with the second pawl arm 53. The linkage assembly 57 may include a linkage arm 59 (e.g., a pin). The linkage arm 59 may be configured to couple the single control member 60 to the proximate ends of the first pawl arm 51 and the second pawl arm 53. The first pawl arm 51 and the second pawl arm 53 may be configured to rotate about the linkage arm 59 at the proximate ends of both the first pawl arm 51 and the second pawl arm 53. The first pawl arm 51 and the second pawl arm 53 may be provided as linkages having a general L-shape. In some embodiments, a length or size of the first pawl arm 51 and the second pawl arm 53 is proportional to a size of the corresponding telescoping supports 30 to which the first pawl arm 51 and the second pawl arm 53 are pivotably coupled. The control member 60 (e.g., a cable, a tensile member, etc.) may be pulled in order to drive pivoting of each of the first pawl arms 51 and the second pawl arms 53, thereby driving the pawls 52 to pivot to allow relative movement of the telescoping members 30.

It should be noted that is some embodiments, in order to rotate the pawls 52 while the projections 44 are engaging the pawls 52, the telescoping supports 30, and the secondary support arm 34 must be moved slightly upward as the pawls rotate outward. The recessed position of the secondary support surface relative to the primary support surfaces allows this upward movement without forcing the secondary support assembly to take on any load being supported by the primary support assembly.

The jack assembly disclosed herein may provide various benefits to users, including eliminating the need for a separate jack stand, which in turn may improve safety, convenience, and cost for a user. The jack assembly is usable as an integrated unit and requires no separate components.

It is important to note that the construction and arrangement of the jack assembly as shown in the various exemplary embodiments is illustrative only. Additionally, any element disclosed in one embodiment may be incorporated or utilized with any other embodiment disclosed herein.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A jack assembly comprising:

a jack base;

a primary support assembly comprising:

- a lift arm movably coupled to the jack base such that the jack assembly is movable between a lowered position and a raised position;
- a primary support member coupled to the lift arm and configured to engage a load when the jack assembly is in the raised position; and
- a handle configured to enable a user to cause movement of the lift arm; and a secondary support assembly comprising:

- a secondary base supported by the jack base;
- a telescoping support movably coupled to the secondary base; and
- a secondary support member movably coupled to the telescoping support and coupled to the primary support member such that movement of the primary support member toward the raised position causes a corresponding movement in the secondary support member.

2. The jack assembly of claim 1, wherein the primary support member defines a first support surface configured to engage the load and the secondary support member defines a second support surface configured to engage the load; wherein the second support surface is recessed relative to the first support surface when the jack assembly is in the raised position.

3. The jack assembly of claim 1, further comprising a positioning member coupled to and extending between the primary support assembly and the secondary support assembly, the positioning member configured to maintain the secondary support assembly vertically aligned with the primary support member as the primary support assembly moves.

4. The jack assembly of claim 3, wherein the positioning member extends between the lift arm of the primary support assembly and the secondary base of the secondary support assembly.

5. The jack assembly of claim 1, further comprising an upper support arm coupling the secondary support member to the telescoping support.

6. The jack assembly of claim 5, wherein the upper support arm comprises a plurality of projections and the telescoping support comprises at least one pawl, wherein the at least one pawl is configured to selectively engage one of the plurality of projections to releasably secure the upper support arm at a desired height relative to the telescoping support.

7. The jack assembly of claim 1, wherein the telescoping support comprises a plurality of projections and the secondary base comprises at least one pawl, wherein the at least one pawl is configured to selectively engage one of the plurality of projections to releasably secure the telescoping support at a desired height relative to the secondary base.

8. The jack assembly of claim 7, further comprising a control member extending from the at least one pawl to the handle, wherein actuation of the control member causes the at least one pawl to disengage from the one of the plurality of projections and enable the telescoping support to telescope into the secondary base.

9. The jack assembly of claim 8, wherein the control member comprises a control cable extending along the handle and graspable by the user.

10. The jack assembly of claim 1, wherein the secondary support assembly is configured to support the load in the event of a failure of the primary support assembly.

11. The jack assembly of claim 10, wherein the secondary support assembly is configured to transmit a force of the load from the secondary support member to the jack base along a secondary load path that is substantially independent from a primary load path configured to transfer the force of the load from the primary support member to the jack base.

12. The jack assembly of claim 1, wherein the telescoping support comprises a plurality of telescoping supports configured to nest with each other and the secondary base when the jack assembly is in the lowered position.

13. A jack assembly comprising:

a jack base;

a primary support assembly comprising:

- a lift arm movably coupled to the jack base such that the jack assembly is movable between a lowered position and a raised position;
- a primary saddle coupled to the lift arm and configured to engage a load when the jack assembly is in the raised position; and
- a handle configured to enable a user to cause movement of the lift arm;

a secondary support assembly comprising:

- a secondary base supported by the jack base;
- a secondary saddle coupled to the primary support assembly such that movement of the primary saddle toward the raised position causes a corresponding movement in the secondary saddle; and
- a plurality of telescoping supports extending between the secondary base and the secondary saddle, wherein the plurality of telescoping supports are releasably lockable at a plurality of different heights.

14. The jack assembly of claim 13, wherein the primary saddle defines a first support surface configured to engage the load and the secondary saddle defines a second support surface configured to engage the load; wherein the secondary saddle is recessed relative to the primary saddle when the jack assembly is in the raised position.

15. The jack assembly of claim 13, further comprising a positioning member coupled to and extending between the primary support assembly and the secondary support assembly, the positioning member configured to maintain the secondary support assembly vertically aligned with the primary saddle as the primary support assembly moves.

16. The jack assembly of claim 15, wherein the positioning member extends between the lift arm of the primary support assembly and the secondary base of the secondary support assembly.

17. The jack assembly of claim 13, further comprising a plurality of upper support arms coupling the secondary saddle to the plurality of telescoping supports, wherein the plurality of upper support arms each comprise a plurality of projections and the plurality of telescoping supports each comprise at least one pawl, wherein the at least one pawl is configured to selectively engage one of the plurality of projections to releasably secure each of the plurality of upper support arms at a desired height relative to the telescoping supports.

18. The jack assembly of claim 13, wherein the plurality of telescoping supports each comprise a plurality of projections and the secondary base comprises at least one pawl, wherein the at least one pawl is configured to selectively engage one of the plurality of projections to releasably secure the plurality of telescoping supports at a desired height relative to the secondary base.

19. The jack assembly of claim 18, further comprising a control member extending from the at least one pawl to the handle, wherein actuation of the control member causes the at least one pawl to disengage from the one of the plurality of projections and enable the plurality of telescoping supports to telescope into the secondary base.

20. A jack assembly comprising:

a jack base;

a primary support assembly comprising:

a lift arm movably coupled to the jack base such that the jack assembly is movable between a lowered position and a raised position;

a primary support member coupled to the lift arm and configured to engage a load when the jack assembly is in the raised position; and a handle configured to enable a user to cause movement of the lift arm;

wherein the primary support assembly defines a primary load path between the load and the jack base;

a secondary support assembly comprising:

a secondary base supported by the jack base;

a secondary support member coupled to the primary support member such that movement of the primary support member toward the raised position causes a corresponding movement in the secondary support member;

a plurality of telescoping supports extending between the secondary base and the secondary support member;

wherein, in the event of a failure of the primary support assembly, the secondary support assembly provides a secondary load path between the load and the jack base that is substantially independent from the primary load path.

* * * * *